(12) United States Patent
Batteram (10) Patent No.: US 7,921,070 B2
(45) Date of Patent: Apr. 5, 2011

(54) METHOD AND APPARATUS FOR IDENTIFYING MESSAGE FIELD NAMES

(75) Inventor: Harold Batteram, Kortenhoef (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 856 days.

(21) Appl. No.: 11/318,843

(22) Filed: Dec. 27, 2005

(65) Prior Publication Data

US 2007/0150604 A1 Jun. 28, 2007

(51) Int. Cl.
*G06F 17/00* (2006.01)
*G06F 15/173* (2006.01)
*G06N 5/02* (2006.01)

(52) U.S. Cl. .......................... 706/48; 709/238
(58) Field of Classification Search .................. None
See application file for complete search history.

(56) References Cited

U.S. PATENT DOCUMENTS

| | | | | |
|---|---|---|---|---|
| 6,396,921 B1 * | 5/2002 | Longster | ....................... | 379/386 |
| 6,438,555 B1 * | 8/2002 | Orton | ................... | 1/1 |
| 6,856,981 B2 * | 2/2005 | Wyschogrod et al. | ............ | 706/48 |
| 7,283,516 B1 * | 10/2007 | Ganesan et al. | ............. | 370/352 |
| 2003/0051043 A1 * | 3/2003 | Wyschogrod et al. | ......... | 709/230 |
| 2004/0162826 A1 * | 8/2004 | Wyschogrod et al. | ........... | 707/6 |
| 2005/0238009 A1 * | 10/2005 | Bell | .............................. | 370/389 |
| 2007/0130140 A1 * | 6/2007 | Cytron et al. | ..................... | 707/6 |

* cited by examiner

*Primary Examiner* — Dohm Chankong
*Assistant Examiner* — Yanet Rodriguez
(74) *Attorney, Agent, or Firm* — Wall & Tong, LLP (57) ABSTRACT

The invention includes a method and apparatus for identifying a field name. The method includes a receiving a message comprising a plurality of fields, each field having a field name, and processing each of a plurality of characters of the received message for identifying the field names, where each character is processed using a plurality of associated arrays. A current character extracted from the received message id processed using a current array selected from the plurality of arrays. The current array used for processing the current character is adapted for identifying one of: (1) one of the plurality of field names or (2) an identifier for identifying a next array for processing the next character extracted from the received message.

20 Claims, 9 Drawing Sheets

FIG. 7

METHOD AND APPARATUS FOR IDENTIFYING MESSAGE FIELD NAMES

FIELD OF THE INVENTION

The invention relates to the field of communication networks and, more specifically, to processing messages for identifying message field names.

BACKGROUND OF THE INVENTION

The Session Initiation Protocol (SIP) is an Internet protocol performing application layer signaling for establishing, modifying, and terminating multimedia sessions between SIP-enabled applications. The SIP protocol is increasingly used for providing multimedia applications (e.g., Internet telephony, conferencing, presence notification, event notification, instant messaging, gaming, and like applications). The SIP protocol is used in many SIP network elements (e.g., SIP client devices, SIP proxy servers, SIP application servers, and the like) which must process SIP messages (e.g., in order to determine a next action) in accordance with various real-time message processing constraints. The SIP network element performance is an important factor in SIP network cost, and efficient SIP message processing is critical for SIP network element performance.

The SIP message format, which includes a sequence of ASCII characters, is defined in various Internet Engineering Task Force (IETF) Requests For Comment (RFCs). In particular, according to RFC 3261, SIP messages include one command line followed by one or more header fields, where each header field includes a header field name and a header field value. The RFC 3261 defines forty-five standardized SIP message header field names (e.g., From, To, Call-Id, and the like), as well as a number of shorthand variations of a portion of the SIP message header field names. Furthermore, several other IETF RFC SIP extension documents define additional SIP message header field names.

The SIP network elements must parse SIP messages to recognize the header fields in order to extract the associated SIP message header values associated with the SIP message header names. Since SIP header names are case-insensitive, SIP message parsers must be able to recognize SIP header names in every possible combination of uppercase and lowercase letters. For this and like reasons, the parsing of SIP messages to recognize SIP message header fields imposes a significant load of SIP network elements (e.g., studies indicate that SIP message parsing may constitute upwards of thirty percent of the total processing load of SIP network elements).

A number of SIP message parsing approaches are currently used for identifying SIP message header field names. In a first approach, incoming SIP messages are translated into a canonical form (e.g., converting all characters to uppercase or lowercase letters). In a second approach, each character in the SIP header field name is processed for determining whether the character is an uppercase or lowercase letter. In a third approach, hash tables are used for recognizing SIP header field names. Disadvantageously, existing SIP message parsing approaches require additional processing steps in order to recognize SIP message header names, thereby adding significant overhead to SIP message parsing processing.

SUMMARY OF THE INVENTION

Various deficiencies in the prior art are addressed through the invention of a method and apparatus for identifying a field name. The method includes receiving a message comprising a plurality of fields, each field having a field name, and processing each of a plurality of characters of the received message for identifying the field names, where each character is processed using a table and a plurality of associated arrays. A current character extracted from the received message is processed using a current array selected from the plurality of arrays. The current array used for processing the current character is adapted for identifying one of: (1) one of the plurality of field names, or (2) a next array for processing the next character extracted from the received message. In one embodiment, the next array is identified directly from the current state array. In another embodiment, the next array is identified indirectly from the current array using a table.

In one embodiment, each array includes a plurality of array entries, where each array entry includes an array index and an array value. For each array entry, the array index includes a character identifier associated with one of a plurality of characters in an available character set. For each array entry, the array value includes one of: (1) an identifier adapted for identifying a field name or (2) an identifier adapted for identifying the next array for processing the next character extracted from the received message. In one embodiment, in which the array value directly identifies the next array, the array value may include a memory address of the next array. In another embodiment, in which the array value indirectly identifies the next array, the array value may include a table index value for searching a table for identifying a memory address of the next array.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements common to the figures.

DETAILED DESCRIPTION OF THE INVENTION

The present invention processes messages for recognizing various portions of messages. In one embodiment, the present invention may process messages for recognizing header field name start character offset values, header field name end character offset values, and header field names, and associated header field value start character offset values, header field value end character offset values, and header field values. In one embodiment, the present invention may process messages for recognizing body field name start character offset values, body field name end character offset values, and body field names, and associated body field value start character offset values, body field value end character offset values, and body field values. The present invention obviates the need for additional processing for distinguishing between character cases, thereby resulting in more efficient message processing. The present invention may be implemented using hardware, firmware, software, and the like, as well as various combinations thereof.

Figure 1:
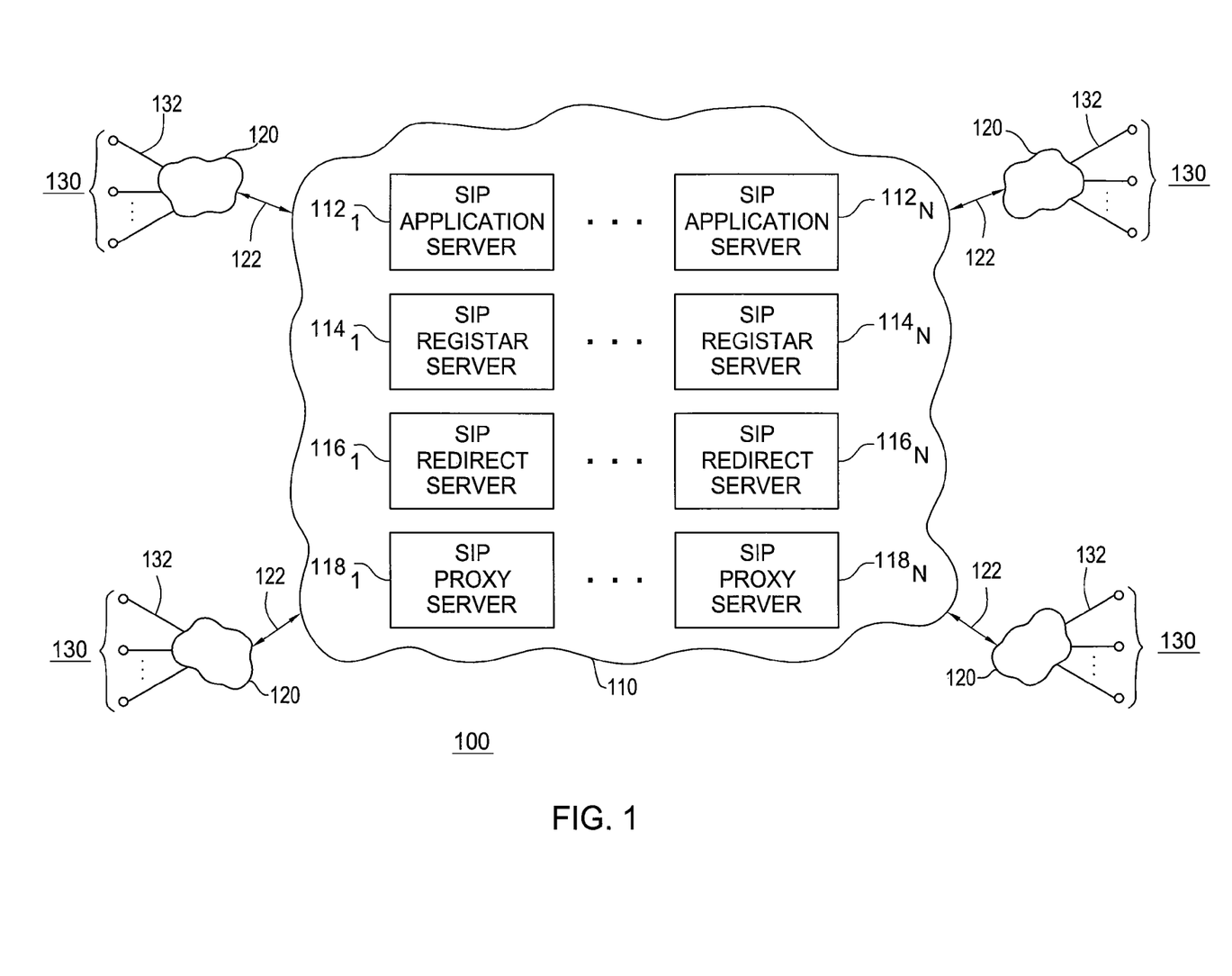
FIG. 1 depicts a high-level block diagram of a communications network architecture.

FIG. 1 depicts a high-level block diagram of a communication network architecture. As depicted in FIG. 1, communication network architecture 100 includes a core network (CN) 110, a plurality of access networks (ANs) 120 (collectively, ANs 120), and a plurality of user terminals (UTs) 130 (collectively, UTs 130). As depicted in FIG. 1, ANs 120 communicate with UTs 130 using a plurality of communication links 132 (collectively, communication links 132). As depicted in FIG. 1, CN 110 communicates with ANs 120 using a plurality of communication links 122 (collectively, communication links 122).

As depicted in FIG. 1, UTs 130 include user terminals adapted for utilizing multimedia applications (e.g., Internet telephony, conferencing, instant messaging, content sharing, gaming, and like applications). As such, UTs 130 include user interfaces adapted for enabling users associated with UTs 130 to participate in audio and video conferences, participate in instant messaging and chatting, request content (from other users and Internet-based sources), and the like, including, audio capture and presentation means, video capture and presentation means, content capture and presentation means, and various other multimedia interaction means. In one embodiment, UTs 130 are SIP-enabled devices adapted for supporting SIP-based sessions for utilizing multimedia applications. In this embodiment, UTs 130 operate as SIP client and/or server devices (depending upon the multimedia application).

As depicted in FIG. 1, ANs 120 include access networks adapted for facilitating communications between UTs 130 and CN 110 for supporting the various multimedia applications utilized by UTs 130. In one embodiment, ANs 120 include access networks adapted for supporting SIP-based communications. The ANs 120 may include any fixed wireline access networks (e.g., Asynchronous Transfer Mode (ATM) networks, Digital Subscriber Line (DSL) networks, cable networks, and the like), fixed wireless networks (e.g., wireless local area networks (WLANs), Worldwide Interoperability for Microwave Access (WIMAX), and the like), mobile wireless networks (e.g., Global System for Mobile Communications (GSM) networks, General Packet Radio Service (GPRS) networks, Wideband Code Division Multiple Access (W-CDMA) networks, and the like), and the like, as well as various combinations thereof.

As depicted in FIG. 1, CN 110 includes a core networks adapted for supporting the various multimedia applications utilized by UTs 130. In one embodiment, CN 110 includes a core network adapted for supporting SIP-based communications. The SIP protocol operates at the application layer and may utilize any transport layer protocol interoperable with Internet Protocol (IP), such as Transmission Control Protocol (TCP), User Datagram Protocol (UDP), and like transport layer protocols. As such, CN 110 may utilize any transport layer protocol for transporting SIP messages As described herein, SIP performs application layer signaling for establishing, modifying, and terminating multimedia sessions between SIP-enabled applications. The SIP protocol, a request-response protocol delivering requests from clients and responses from servers, is increasingly used for providing multimedia applications (e.g., Internet telephony, conferencing, presence notification, event notification, instant messaging, gaming, and like Internet-based multimedia applications). The SIP protocol is used in many SIP network elements (e.g., SIP client devices, SIP proxy servers, SIP redirect servers, SIP registrar servers, SIP application servers, and the like) which process SIP messages in support of various multimedia applications.

As depicted in FIG. 1, core network 110 includes a plurality of SIP application servers $112_1$-$112_N$ (collectively, SIP application servers 112), a plurality of SIP registrar servers $114_1$-$114_N$ (collectively, SIP registrar servers 114), a plurality of SIP redirect servers $116_1$-$116_N$ (collectively, SIP redirect servers 116), and a plurality of SIP proxy servers $118_1$-$118_N$ (collectively, SIP application servers 118). Although specific SIP servers are depicted, various other SIP servers may be used for facilitating SIP-based communications in IP network 110 The SIP application servers 112, SIP registrar servers 114, SIP redirect servers 116, SIP proxy servers 118, and various other SIP servers operable for receiving, processing, and transmitting SIP messages are collectively referred to herein as SIP servers.

In one embodiment, for example, core network 110 comprises an IP Multimedia Subsystem (IMS) network including various SIP-based network elements, including Proxy Call Session Control Functions (P-CSCFs), Interrogating Call Session Control Functions (I-CSCFs), Serving Call Session Control Functions (S-CSCFs), Breakout Gateway Control Functions (BGCF), Home Subscriber Servers (HSSs), Subscriber Location Functions (SLFs), Media Resource Function Controllers (MRFCs), Media Resource Function Processors (MRFPs), Signaling Gateways (SGs), Media Gateway Controller Functions (MGCFs), Media Gateways (MGs), and various other application servers, control functions, gateways, and like SIP-based network elements, as well as various combinations thereof.

As described herein, the present invention processes incoming SIP messages for recognizing various portions of SIP message headers, including SIP message header field names. As such, the present invention may be implemented on any network element supporting SIP-based communications. For example, the present invention may be implemented using software, hardware, or a combination of software and hardware on SIP application servers 112, SIP registrar servers 114, SIP redirect servers 116, SIP proxy servers 118, and various other SIP servers operable for receiving, processing, and transmitting SIP messages, as well as UTs 130, and various other SIP-based network elements.

Figure 2:
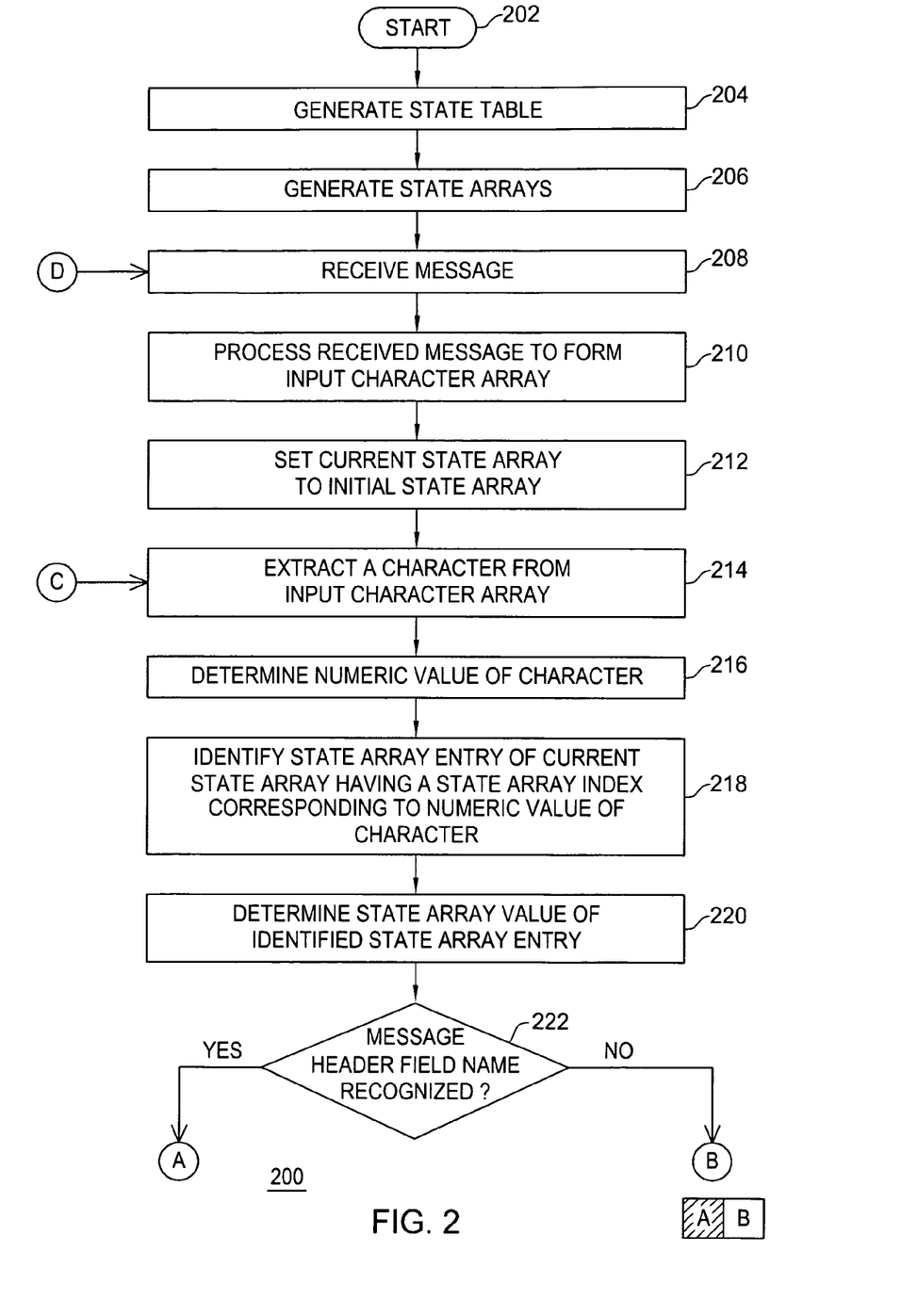
FIG. 2 depicts a method according to one embodiment of the present invention.

FIG. 2 depicts a method according to one embodiment of the present invention. Specifically, method 200 of FIG. 2 comprises a method for processing a message header for identifying message header field names. Although primarily described with respect to processing a SIP message header, method 200 of FIG. 2 may be adapted for processing various other messages. Although depicted as being performed serially, those skilled in the art will appreciate that at least a portion of the steps of method 200 may be performed contemporaneously, or in a different order than presented in FIG. 2. The method 200 begins at step 202 and proceeds to step 204.

At step 204, a state table is generated. At step 206, at least one state array is generated. In one embodiment, the state table and associated state arrays are generated as depicted and described herein with respect to FIG. 3. In one embodiment, the state table and associated state arrays are utilized as depicted and described herein with respect to FIG. 4 and FIG. 5. At step 208, a message is received. At step 210, the received message is processed to form an input character array. In one embodiment, each entry of the input character array includes one character from the received message. In one such embodiment, the input character array is processed character-by-character (e.g., (using a character read function which returns, upon request, each next character in the input character sequence) for identifying message header field names. Although not depicted, in one embodiment, characters of a received message are processed directly without using an input character array (in which case step 210 is not performed).

In one embodiment, the present invention processes SIP messages for identifying SIP message header field names. In one such embodiment, since SIP messages may be transported using various protocols, a received message (e.g., TCP packet, UDP datagram, and like transport structures depending on the transport protocol) from which the input character array is formed may include a portion of a SIP message, a complete SIP message, or a plurality of concatenated SIP messages. In one such embodiment, in which the present invention processes SIP messages for identifying SIP message header field names, the input character array comprises ASCII characters. In one such embodiment, the ASCII coded character set is defined by American National Standards Institute (ANSI) Specification X3.4-1986, which assigns a unique numeric value (i.e., value between 0 and 255) to each ASCII character (e.g., uppercase character "F" has a value of 70 and lowercase character "f" has a value of 102).

At step 212, an initial state array is set as the current state array. The current state array identifies the state array used for processing the currently selected character from the input character array. In one embodiment, the initial state array is set as the current state array by accessing the initial state array using the state table (e.g., the initial state array is configured as the state array associated with the state table entry having a state table index equal to zero). In one embodiment, the current state array is maintained using a variable (e.g., a CURRENT STATE ARRAY variable). In one embodiment, the current state array is changed according to the state array value of the state array entry selected from the current state array (such that the next character from the input character array is processed according to the new value of the current state array).

At step 214, a character is extracted from the input character array. At step 216, a numeric value of the character extracted from the input character array is determined. At step 218, a state array entry of the current state array is identified. In one embodiment, the identified state array entry has a corresponding state array index corresponding to the numeric value of the character extracted from the input character array. At step 220, the state array value of the identified state array entry is determined (i.e., the state array value associated with the identified state array index). At step 222, a determination is made as to whether a message header field name is recognized. If a message header field name is recognized, method 200 proceeds to step 224. If a message header field name is not recognized, method 200 proceeds to step 232.

At step 224, the recognized message header field name is determined according to the state array value (e.g., a state array value of negative one may indicate that message header field name "From:" has been identified). In one embodiment, the message header field name is determined using at least one message header field name lookup table including a mapping of state array values to corresponding message header field names. At step 226, the message header field name is output. In one embodiment, the identified message header field name is stored in a message header field name output file. In one such embodiment, message header field name output file is used for performing further processing on the message headers (e.g., identifying and processing associated message header field values).

At step 228, a determination is made as to whether the input character array is completely processed (i.e., a determination is made as to whether the final character in the input character array has been processed). If the input character array is not completely processed, method 200 returns to step 214, at which point another character is extracted from the input character array (i.e., the next character in the input character array is extracted for further processing). If the input character array is completely processed, method 200 proceeds to step 230. At step 230, another message is received. The method 200 then returns to step 208, at which point a message header associated with the received message is extracted.

At step 232, a state table entry having a state table index corresponding to the state array value is identified. In other words, the numeric value of the extracted character is used to search the state array indices of the current state array, and the state array value associated with the state array entry having a state array index matching the numeric value of the extracted character is used to search the state table indices for identifying a state table entry. At step 234, a state table value of the identified state table entry is determined. At step 236, the state table value of the identified state table entry is used for determining the next state array (i.e., for changing the current state array prior to processing the next character from the input character array). In one embodiment, in which the current state array is tracked by maintaining a CURRENT STATE ARRAY variable, the CURRENT STATE ARRAY value is modified according to the state table value of the state table entry identified using the state array value.

At step 238, a determination is made as to whether the input character array is completely processed. (i.e., a determination is made as to whether the final character in the input character array has been processed). If the input character array is not completely processed, method 200 returns to step 214, at which point another character is extracted from the input character array (i.e., the next character in the input character array is extracted for further processing). If the input character array is completely processed, method 200 proceeds to step 240.

Although not depicted, in one embodiment, if the input character array is completely processed, and another message has not been received, method 200 may be paused upon detection that the message header field name identification process has reached the end of the input character array without having detected the end of a message (e.g., SIP message). In this embodiment, method 200 may be resumed upon detection that another message (i.e., another input character sequence) is received. This embodiment may be required for processing SIP messages from a streamed network protocol (e.g., TCP) that delivers SIP messages in a fragmented series of input character sequences.

At step 240, the current state array (identified using the state table value) is stored. In one embodiment, in which the current state array is tracked using a CURRENT STATE ARRAY variable, the value of the CURRENT STATE ARRAY variable is stored. At step 242, another message is received. At step 244, a message header associated with the received message is extracted. At step 246, the message header is processed to form an input character array. The method 200 returns to step 214, at which point a character is extracted from the input character array.

In one embodiment of the present invention, upon completion of message header field name identification processing, the message header field name identification processing output includes at least one of: (1) recognized message header field names, (2) recognized message header field names including the start character offset position and end character offset position of each recognized message header field name, (3) message header field values, and (4) message header field value including the start character offset position and end character offset position of each recognized SIP message header name value. Although described as including specific output, those skilled in the art will appreciate that the message header field name identification processing output may include fewer or more output information, or different output information, as well as various combinations thereof, depending on the message types processed in using the present invention.

Figure 3:
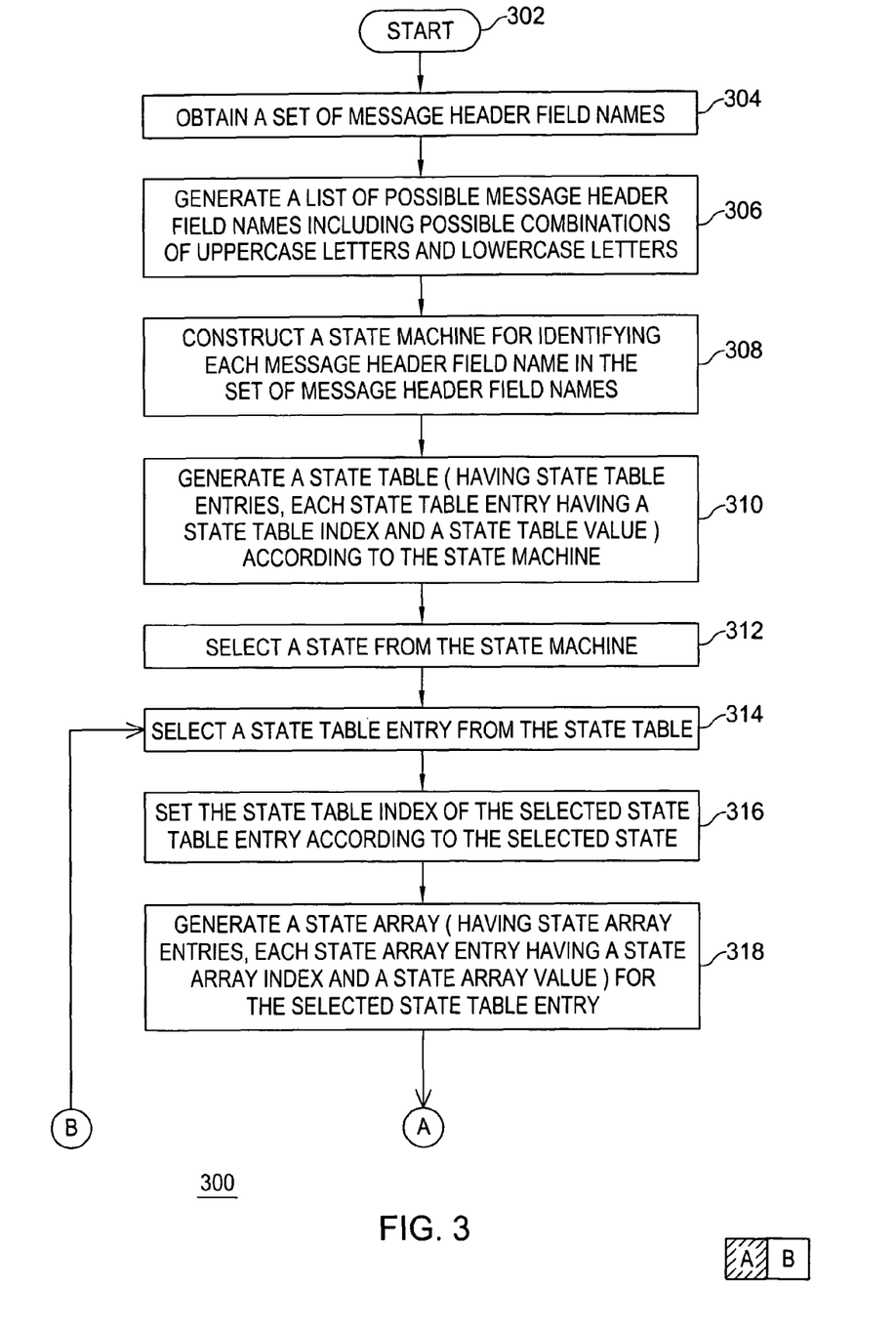
FIG. 3 depicts a method according to one embodiment of the present invention.

FIG. 3 depicts a method according to one embodiment of the present invention. Specifically, method 300 of FIG. 3 comprises a method for generating a state table and associated state arrays. Although depicted as being performed serially, those skilled in the art will appreciate that at least a portion of the steps of method 300 may be performed contemporaneously, or in a different order than presented in FIG. 3. The method 300 begins at step 302 and proceeds to step 304.

At step 304, a set of message header field names is obtained. The set of message header field names may include a partial set of message header field names supported by a protocol, a full set of message header field names supported by a protocol, a set of message header field names supported by a plurality of protocols, and the like. At step 306, a list of possible message header field names is generated. Since some protocols allow messages using various combinations of uppercase and lowercase letters, the list of possible message header field names includes possible combinations of uppercase and lowercase letters. For example, SIP message header field names "From:" and "from:" may both be included in the list of possible message header field names.

At step 308, a state machine is constructed. A state machine includes a plurality of states. The state machine operates according to state transitions between states. The state transitions occur in response to state transition trigger conditions. In one embodiment, the state machine is constructed in a manner for identifying each message header field name in the set of message header field names (i.e., by identifying each possible message header field name in the list of message header field names). In one such embodiment, in which character-by-character processing of input character arrays is performed for identifying message header field names, each character from the input character array triggers a state transition.

At step 310, a state table is generated. In one embodiment, the generated state table includes a state table entry for each state of the associated state machine. In one embodiment, state table entries of the generated state table are initialized to correspond to respective states of the state machine. At step 312, a state is selected from the state machine. At step 314, a state table entry is selected from the state table. In one embodiment, an available state table entry (i.e., not associated with a state of the state machine) is selected. In another embodiment, in which state table entries are associated with states of the state machine upon generation of the state table, the state table entry corresponding to the selected state is selected. At step 316, the state table index of the selected state table entry is set according to the selected state (i.e., the selected state table entry is initialized to correspond to the state selected from the state machine).

In one embodiment, the state table is generated according to the state machine. In one embodiment, the state table includes state table entries. In one such embodiment, each state table entry includes a state table index and a state table value. In one embodiment, a state table index associated with a state table entry may be used for searching the state table for identifying that state table entry. In one embodiment, a state table value associated with a state table entry includes information for accessing an associated state array (e.g., state table values store memory addresses associated with corresponding state arrays). The generated state table is stored in memory.

At step 318, a state array is generated for the selected state table entry. In one embodiment, the state array includes state array entries, where each state array entry includes a state array index and a state array value. In one embodiment, the state array indices associated with state array entries are used for searching the state array for identifying state array entries. In one embodiment, the state array indices correspond to the numeric values of the characters in the character set from which messages are constructed. In one embodiment, the state array values include information for accessing state table entries (e.g., state table indices used for accessing state table entries for identifying the memory addresses of other state arrays). The generated state array is associated with the state selected from the state machine (i.e., the state array defines the state transitions and associated state transition trigger conditions associated with the selected state from the state machine). The generated state array is stored in memory.

At step 320, the state array indices of the state array are set according to the numeric values of the character set from which messages are constructed (i.e., from the respective possible combinations of uppercase letters and lowercase letters). At step 322, the selected state is processed for determining associated state transitions and state transition trigger conditions. At step 324, the state array values of the state array are set according to the state transitions and associated state transition trigger conditions. At step 326, the state table value of the state table entry associated with the state array is set in a manner for locating the state array.

For example, assume the selected state (state zero) transitions to another state (state one) in response to a carriage return (i.e., trigger condition). Since the numeric value of a carriage return is thirteen, the state array entry for which the state array index is equal to thirteen is selected, and the associated state array value is set equal to one (indicating that the state array associated with the state table entry for which the state table index is equal to one is used for processing the next character from the input character array). The state table value associated with the state table entry corresponding to the state array is set in a manner for locating the state array (e.g., the state table value includes a memory address identifying the memory location in which the state array is stored).

At step 328, a determination is made as to whether the final state of the state machine has been processed. If the final state of the state machine has not been processed, method 300 proceeds to step 330. At step 330, another state is selected from the state machine. From step 330, method 300 returns to step 314, at which point another state table entry is selected from the state table (i.e., another state table entry is selected for maintaining information for identifying the next state array created for the selected state). If the final state of the state machine has been processed, method 300 proceeds to step 332, where method 300 ends.

As described herein, for each state array entry, the state array value includes one of: (1) an identifier adapted for identifying a field name or (2) an identifier adapted for identifying the next state array for processing the next character extracted from the received message. In one embodiment, in which the state array value directly identifies the next state array, the state array value may include a memory address of the next state array. In another embodiment, in which the state array value indirectly identifies the next state array, the state array value may include a table index value for searching a table for identifying a memory address of the next array. As such, although method 200 of FIG. 2 and method 300 of FIG. 3 are depicted and described as utilizing a state table, in one embodiment, method 200 of FIG. 2 and method 300 of FIG. 3 may be implemented using only state arrays (i.e., steps requiring generation, searching, and like processing of a state table are not performed).

Figure 4:
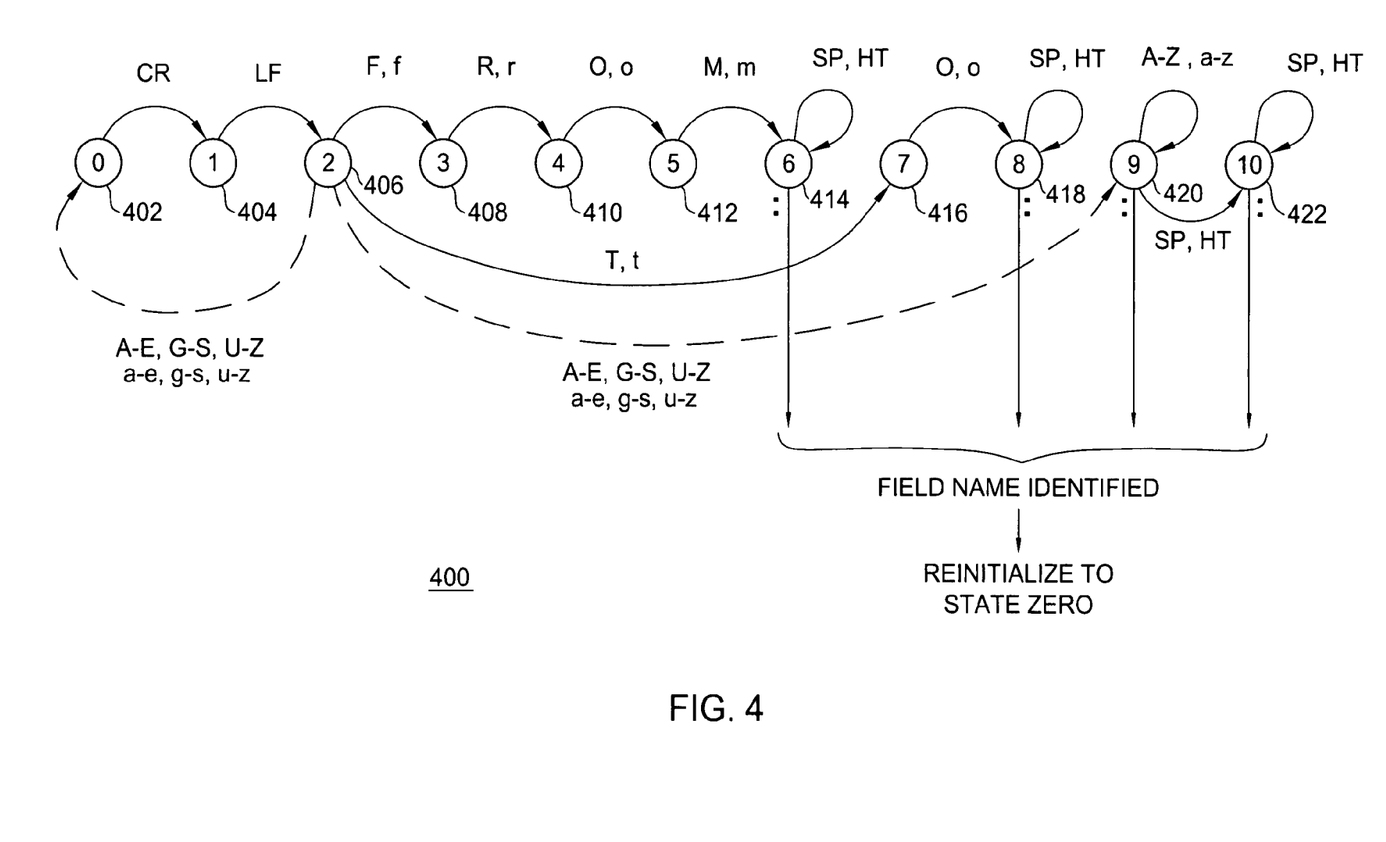
FIG. 4 depicts a state machine representation according to an example of one embodiment of the present invention.

FIG. 4 depicts a state machine according to an example of one embodiment of the present invention. For purposes of clarity by example, a state machine, and associated state machine transitions and state machine trigger conditions, are depicted and described herein with respect to only two SIP message header field names (i.e., "From:" and "To:"). Those skilled in the art will appreciate that various other state machines and associated state machine transitions and state transition trigger conditions may be determined and implemented for various other combinations of SIP message header field names.

As depicted in FIG. 4, state machine 400 is initialized to state zero (denoted as 402). For purposes of clarity, re-initialization of state machine 400 (i.e., transitions from states 402-422 back to state 402) in response to detection of an unexpected character are not depicted or described with respect to FIG. 4; rather, re-initialization is depicted and described herein with respect to FIG. 5. As depicted in FIG. 4, from state zero, state machine 400 transitions to state one (denoted as 404) in response to a carriage return (CR). From state one, state machine 400 transitions to state two (denoted as 406) in response to a line feed (LF).

From state two, state machine 400 transitions to one of: state three (denoted as 408) in response to uppercase letter "F" or lowercase letter "f"; state seven (denoted as 416) in response to uppercase letter "T" or lowercase letter "t"; or state nine (denoted as 420) in response to any other character (i.e., uppercase letters A-E, G-S, U-Z or lowercase letters a-e, g-s, u-z). In other words, state machine 300 transitions to one of: state three in response to a potential detection of a first portion of message header field name "From:"; state seven in response to a potential detection of a first portion of message header field name "To:"; or state nine in response to detection of any other characters not indicative of the first letter of message header field names "From:" or "To:".

With respect to detection of SIP message header field name "From:" state machine 400 transitions from state two to state three in response to uppercase letter "F" or lowercase letter "f". From state three, state machine 400 transitions to state four (denoted as 410) in response to uppercase letter "R" or lowercase letter "r". From state four, state machine 400 transitions to state five (denoted as 412) in response to uppercase letter "O" or lowercase letter "o". From state five, state machine 400 transitions to state six (denoted as 414) in response to uppercase letter "M" or lowercase letter "m". At this point, SIP message header field name "From" has been detected. As such, since one or more space (SP) or horizontal tab (HT) characters may be disposed between the SIP message header field name (i.e., "From") and the SIP message header field name end character (i.e., a colon(:)), state machine 400 loops within state six in response to a space (SP) or a horizontal tab (HT). Upon detection of a colon (:), indicating full detection of SIP message header field name "From:" (including the SIP message header field name end character (:)), state machine 400 reinitializes to state zero for processing the next input character in the input character array.

With respect to detection of SIP message header field name "To:" state machine 400 transitions from state two to state seven in response to uppercase letter "T" or lowercase letter "t". From state seven, state machine 400 transitions to state eight (denoted as 418) in response to uppercase letter "O" or lowercase letter "o". At this point, SIP message header field name "To" has been detected. As such, since one or more space (SP) or horizontal tab (HT) characters may be disposed between the SIP message header field name (i.e., "To") and the SIP message header field name end character (i.e., a colon(:)), state machine 400 loops within state eight in response to a space (SP) or a horizontal tab (HT). Upon detection of a colon (:), indicating full detection of SIP message header field name "To:" (including the SIP message header field name end character (:)), state machine 400 reinitializes to state zero for processing the next input character in the input character array.

With respect to detection of characters in the input character array other than uppercase letter "F" and lowercase letter "f" and uppercase letter "T" and lowercase letter "t", various state transitions may be implemented in different embodiments of the present invention. In an embodiment in which state machine 400 is configured solely for recognizing SIP message header field names "From:" and "To:", state machine 400 may be reinitialized in response to uppercase letters "A" through "E", "G" through "S", or "U" through "Z" or lowercase letters "a" through "e", "g" through "s", or "u" through "z". In an embodiment in which state machine 400 is configured for recognizing SIP message header field names "From:" and "To:", as well as for recognizing other standardized or proprietary SIP message header field names, state machine 400 may transition to another state in response to uppercase letters "A" through "E", "G" through "S", or "U" through "Z" or lowercase letters "a" through "e", "g" through "s", or "u" through "z".

In one embodiment, not depicted for purposes of clarity, state machine 400 optionally transitions from any state other than state zero to state zero in response to uppercase letters "A" through "E", "G" through "S", or "U" through "Z" or lowercase letters "a" through "e", "g" through "s", or "u" through "z". In another embodiment, depicted as an optional state transition, state machine 400 optionally transitions from state two to state zero, in response to uppercase letters "A" through "E", "G" through "S", or "U" through "Z" or lowercase letters "a" through "e", "g" through "s", or "u" through "z".

In another embodiment, depicted as an optional state transition, state machine 400 transitions from state two to state nine (denoted as 420) in response to uppercase letters "A" through "E", "G" through "S", or "U" through "Z" or lowercase letters "a" through "e", "g" through "s", or "u" through "z". The state machine 400 transitions from state nine to state ten (denoted as 422) in response to a space (SP) or a horizontal tab (HT). The state machine 400 loops within state nine in response to any character other than a space (SP) or a horizontal tab (HT). The state machine 400 loops within state ten in response to a space (SP) or a horizontal tab (HT). Upon detection of a colon (:) from state nine or state ten, state machine 400 reinitializes to state zero for processing the next input character in the input character array.

Figure 5:
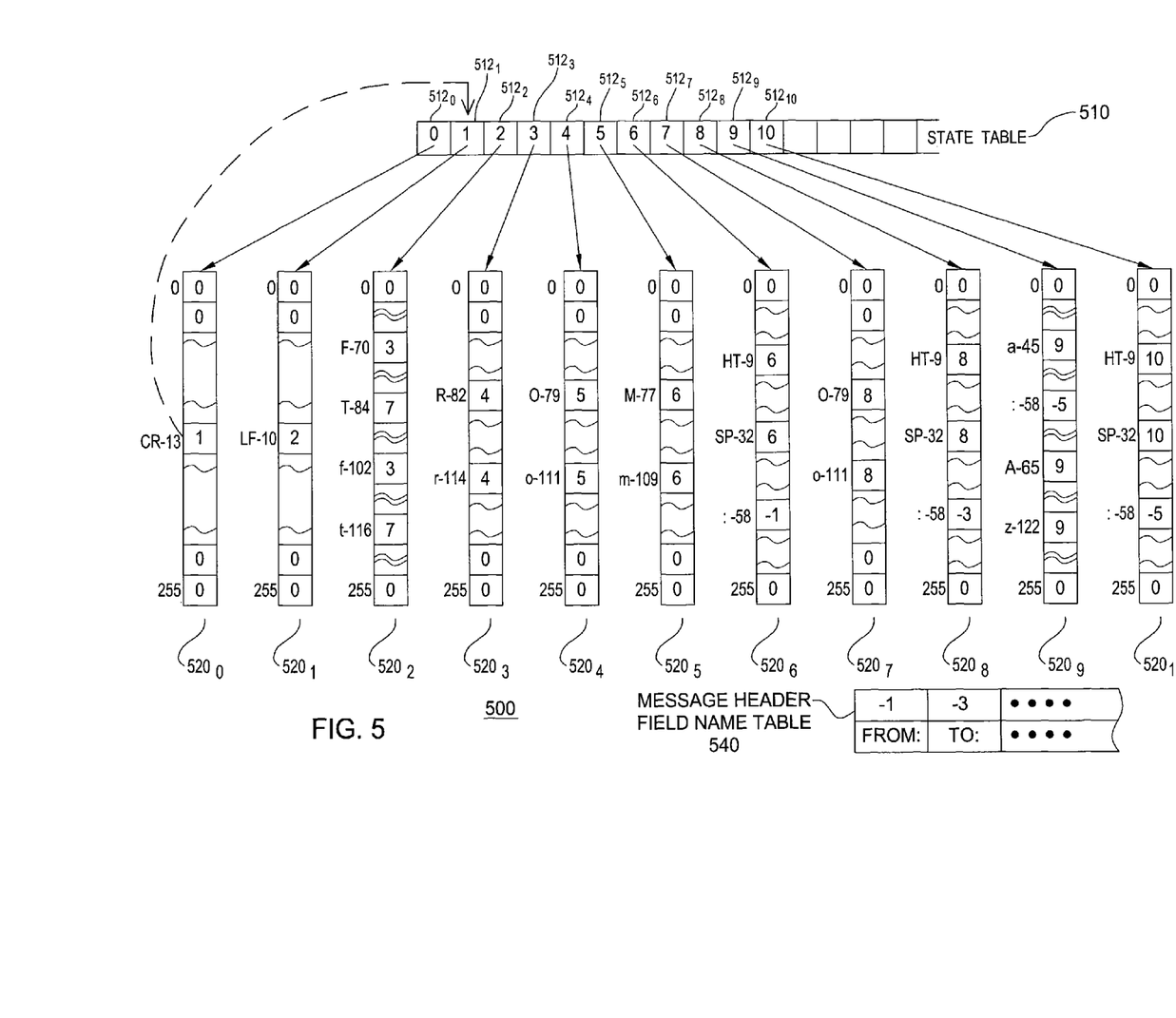
FIG. 5 depicts an implementation of the state machine representation of FIG. 4 implemented using a plurality of state arrays.

FIG. 5 depicts an implementation of the state machine representation of FIG. 4 implemented using a plurality of state arrays and a state table. As depicted in FIG. 5, implementation 500 includes a state table 510 and an associated plurality of state arrays $520_0$-$520_{10}$ (collectively, state arrays 520). Although depicted and described herein with respect to FIG. 5 as using a plurality of state arrays and a state table for identifying message field names, in another embodiment, depicted and described herein with respect to FIG. 6, a plurality of state arrays may be used for identifying message field names (i.e., since a current state array is used for directly identifying a next state array, a separate state table is not required).

As depicted in FIG. 5, state table 510 includes a plurality of state table entries $512_0$-$512_N$ (collectively, state table entries 512). The state table entries $512_0$-$512_{10}$ each include a state table index and a corresponding state table value. The state table indexes associated with state table entries $512_0$-$512_{10}$ (denoted as integer values from zero through ten) are stored in state arrays 520 for linking state arrays 520 according to state transitions required for processing received messages for identifying message field names. The state table values associated with state table entries $512_0$-$512_{10}$ include identifiers for identifying state arrays $520_0$-$520_{10}$, respectively. In one embodiment, state table entries $512_0$-$512_{10}$ include memory addresses identifying the memory locations of state arrays $520_0$-$520_{10}$, respectively.

As depicted in FIG. 5, the state arrays $520_0$-$520_{10}$ include respective pluralities of state array entries (where each state array entry includes a state array index and a corresponding state array value). As depicted in FIG. 5, each state array 520 includes 256 state array entries having 256 state array indices and 256 state array values, respectively. Since, state table entries $512_0$-$512_{10}$ represent states zero through ten of state machine 400 of FIG. 4, state arrays $520_0$-$520_{10}$ represent (through a combination of state array indices and state array values) state transitions associated with states zero through ten of state machine 400 of FIG. 4.

As depicted in FIG. 5, each state array 520 includes 256 state array entries, where each state array entry includes a state array index and a state array value. The state array indices associated with the state array entries are numbered 0 through 255, where each of the numeric values 0 through 255 corresponds to a numeric representation of a different ASCII character (e.g., CR=13, LF=10, F=70, T=84, and the like). As described herein, the state array indices are used for searching the corresponding state array. As an input character array is processed, each character extracted from the input character array is processed for determining the numeric value associated with that character (e.g., according to ASCII character processing rules as known in the art). The state array indices of the current state array (i.e., either an initialization state array (illustratively, state array $520_0$) or a state array selected based upon processing of a previous state array (illustratively, one of the state arrays $520_1$-$520_{10}$)) are search using the numeric value associated with the extracted character from the input character array.

As depicted in FIG. 5, the state array values associated with the state array entries of the selected state array, which vary across state array entries within a state array, identify the next action to be taken. A state array value may indicate that a SIP message header field name has been successfully identified (e.g., state array value is less than zero). A state array value may identify that an unexpected character has been identified (e.g., state array value equal to zero). A state array value may identify than another character in a SIP message header field name has been successfully identified, however, the full SIP message header field name has not been identified (e.g., state array value is greater than zero). Since at least one additional character must be processed in order to identify the full SIP message header field name, a state array value greater than zero identifies a state table entry in state table 510 that is accessed for determining the memory address of the next state array that is accessed for processing the next character in the input character array.

As described herein, state arrays 520 are configured for providing functions similar to the states and associated state transitions of state machine 400 depicted and described herein with respect to FIG. 4 (state arrays $520_0$-$520_{10}$ provide functions equivalent to states 402 through 422 of state machine 400). As depicted in FIG. 5, state array $520_0$ includes a state array value of one (i.e., a pointer to state table entry $512_1$ storing a memory address for state array $520_1$) for a state array index of thirteen (i.e., CR=13) and state array values of zero (i.e., a pointer to state table entry $512_0$ storing a memory address for state array $520_0$) for state array indices other than thirteen (i.e., any character other than a carriage return). As described herein, in one embodiment, state array $520_0$ is an initialization array used for reinitializing message processing in response to unknown characters, invalid characters, and the like.

The state array $520_1$ includes a state array value of two (i.e., a pointer to state table entry $512_2$ storing a memory address for state array $520_2$) for a state array index of ten (i.e., LF=10) and state array values of zero (i.e., pointers to state table entry $512_0$ storing a memory address for state array $520_0$) for state array indices other than ten (i.e., any character other than a line feed). The state array $520_2$ includes a state array value of three (i.e., a pointer to state table entry $512_3$ storing a memory address for state array $520_3$) for a state array index of seventy or one hundred two (i.e., F=70, f=102), a state array value of seven (i.e., a pointer to state table entry $512_7$ storing a memory address for state array $520_7$) for a state array index of eighty-four or one hundred sixteen (i.e., T=84, t=116).

In one embodiment, state array $520_2$ includes state array values of zero (i.e., pointers to state table entry $512_0$ storing a memory address for state array $520_0$) for state array indices other than seventy, one hundred two, eighty-four, and one hundred sixteen (i.e., any character other than "F", "f", "T", or "t"). In this embodiment, processing is reset in response to unknown headers. In another embodiment, depicted as an optional state transition in FIG. 4, state array $520_2$ includes state array values of nine (i.e., a pointer to state table entry $512_9$ storing a memory address for state array $520_9$) for state array indices other than seventy, one hundred two, eighty-four, and one hundred sixteen (i.e., any character other than "F", "f", "T", or "t"). In this embodiment, processing of unknown headers may be performed using the additional states (states nine and ten of FIG. 4).

The state array $520_3$ includes a state array value of four (i.e., a pointer to state table entry $512_4$ storing a memory address for state array $520_4$) for a state array index of eighty-two or one hundred fourteen (i.e., R=82, r=114) and state array values of zero (i.e., pointers to state table entry $512_0$ storing a memory address for state array $520_0$) for state array indices other than eighty-two and one hundred fourteen (i.e., any character other than "R" or "r"). The state array $520_4$ includes a state array value of five (i.e., a pointer to state table entry $512_5$ storing a memory address for state array $520_5$) for a state array index of seventy-nine or one hundred eleven (i.e., O=79, o=111) and state array values of zero (i.e., pointers to state table entry $512_0$ storing a memory address for state array $520_0$) for state array indices other than seventy-nine and one hundred eleven (i.e., any character other than a "O" and "o").

The state array $520_5$ includes a state array value of six (i.e., a pointer to state table entry $512_6$ storing a memory address for state array $520_6$) for a state array index of seventy-seven or one hundred nine (i.e., O=77, o=109) and state array values of zero (i.e., pointers to state table entry $512_0$ storing a memory address for state array $520_0$) for state array indices other than seventy-seven and one hundred nine (i.e., any character other than "M" and "m"). The state array $520_6$ includes a state array value of six (i.e., a pointer to state table entry $512_6$ storing a memory address for state array $520_6$) for a state array index of nine or thirty-two (i.e., HT=9, SP=32), a state array value of negative one (i.e., an indication that SIP message header field name "From:" is identified) for a state array index of fifty-eight (i.e., colon(:)=58), and state array values of zero (i.e., pointers to state table entry $512_0$ storing a memory address for state array $520_0$) for state array indices other than nine, thirty-two, and fifty-eight (i.e., any character other than a horizontal tab, a space, or a colon).

The state array $520_7$ includes a state array value of eight (i.e., a pointer to state table entry $512_8$ storing a memory address for state array $520_8$) for a state array index of seventy-nine or one hundred eleven (i.e., O=79, o=111) and state array values of zero (i.e., pointers to state table entry $512_0$ storing a memory address for state array $520_0$) for state array indices other than seventy-nine and one hundred eleven (i.e., any character other than a "O" and "o"). The state array $520_8$ includes a state array value of eight (i.e., a pointer to state table entry $512_8$ storing a memory address for state array $520_8$) for a state array index of nine or thirty-two (i.e., HT=9, SP=32), a state array value of negative three (i.e., an indication that SIP message header field name "To:" is identified) for a state array index of fifty-eight (i.e., colon(:)=58), and state array values of zero (i.e., pointers to state table entry $512_0$ storing a memory address for state array $520_0$) for state array indices other than nine, thirty-two, and fifty-eight (i.e., any character other than a horizontal tab, a space, or a colon).

The state array $520_9$ includes a state array value of nine (i.e., a pointer to state table entry $512_9$ storing a memory address for state array $520_9$) for a state array index corresponding to any of the uppercase letters "A" through "Z" any of the lowercase letters "a" through "z", or a space (e.g., A=65, Z=122, space=45, and the like), a state array value of negative five (i.e., an indication that an unknown SIP message header field name (i.e., a valid field name syntax indicating a message header field name other than "From:" or "To:") is identified) for a state array index of fifty-eight (i.e., colon(:) =58), and state array values of zero (i.e., pointers to state table entry $512_0$ storing a memory address for state array $520_0$) for state array indices other than any of the uppercase letters "A" through "Z", any of the lowercase letters "a" through "z", a space, or a colon.

The state array $520_{10}$ includes a state array value of ten (i.e., a pointer to state table entry $512_{10}$ storing a memory address for state array $520_{10}$) for a state array index of nine or thirty-two (i.e., HT=9, SP=32), a state array value of negative five (i.e., an indication that an unknown SIP message header field name (i.e., a valid field name syntax indicating a message header field name other than "From:" or "To:") is identified) for a state array index of fifty-eight (i.e., colon(:)=58), and state array values of zero (i.e., a pointer to state array $520_0$) for state array indices other than nine, thirty-two, and fifty-eight (i.e., any character other than a horizontal tab, a space, or a colon).

As such, state arrays $520_9$ and $520_{10}$ are adapted for identifying a valid field name syntax indicating a field name other than "From:" or "To:". In one embodiment, state array $520_2$ includes state array values of nine (i.e., a pointer to state table entry $512_9$ storing a memory address for state array $520_9$) for state array indices other than seventy, one hundred two, eighty-four, and one hundred sixteen (i.e., any character other than "F", "f", "T", or "t"). Since a horizontal tab (HT=9) or space (SP=32) may only occur between the final letter of the message field name and the colon, state arrays $520_9$ and $520_{10}$ include state array values of ten for a state array index of nine or thirty-two (i.e., HT=9, SP=32), enabling identification of spaces and horizontal tabs in unknown header names (rather than reinitializing to state array $520_0$ for unknown header names having spaces or horizontal tabs).

Since implementation 500 of FIG. 5 provides an implementation (using state arrays and a state table) of state machine 400 of FIG. 4, the operation of state machine 400 of FIG. 4 is described with respect to implementation 500 of FIG. 5. The operation of table-based implementation 500 is described with respect to input character string "<CR><LF>To:". Although described in detail with respect to identification of the "To:" message header field name, table-based implementation 500 may be used for identifying the "From:" message header field name, and, optionally, other unknown message header field names, as depicted and described with respect to state machine 400 of FIG. 4. In one embodiment, as described herein, pointers described with respect to state table entries $512_0$-$512_{10}$ of state table 510 include memory addresses for locating state arrays $520_0$-$520_{10}$.

With respect to processing of input character array "<CR><LF>From:", the processing of state table 510 is initialized such that the current state array is initialized to state array $520_0$. The first character (i.e., <CR>) is extracted from the input character array. The <CR> character is processed for determining a numeric value for character <CR> (i.e., CR=13). The state array indices of state array $520_0$ are searched for identifying the state array entry having a state array index of thirteen. The state array value associated with the state array entry having a state array index of thirteen is equal to one. The state table index of state table 510 is searched using the retrieved state array value (i.e., one). As depicted in FIG. 5, the state table value of the state table entry associated with state table index of one includes a pointer to state array $520_1$. The current state array is switched from state array $520_0$ to state array $520_1$ according to the state table value for processing the next character from the input character array.

The second character (i.e., <LF>) is extracted from the input character array. The <LF> character is processed for determining a numeric value for character <LF> (i.e., LF=10). The state array indices of state array $520_0$ are searched for identifying the state array entry having a state array index of ten. The state array value associated with the state array entry having a state array index of ten is equal to two. The state table index of state table 510 is searched using the retrieved state array value (i.e., two). As depicted in FIG. 5, the state table value of the state table entry associated with state table index of two includes a pointer to state array $520_2$. The current state array is switched from state array $520_1$ to state array $520_2$ according to the state table value for processing the next character from the input character array.

The third character (i.e., "T") is extracted from the input character array. The "T" character is processed for determining a numeric value for character "T" (i.e., T=84). The state array indices of state array $520_2$ are searched for identifying the state array entry having a state array index of eighty-four. The state array value associated with the state array entry having a state array index of eighty-four is equal to seven. The state table index of state table 510 is searched using the retrieved state array value (i.e., seven). As depicted in FIG. 5, the state table value of the state table entry associated with state table index of seven includes a pointer to state array $520_7$. The current state array is switched from state array $520_2$ to state array $520_7$ according to the state table value for processing the next character from the input character array.

The fourth character (i.e., "o") is extracted from the input character array. The "o" character is processed for determining a numeric value for character "o" (i.e., o=111). The state array indices of state array $520_7$ are searched for identifying the state array entry having a state array index of one hundred eleven. The state array value associated with the state array entry having a state array index of one hundred eleven is equal to eight. The state table index of state table 510 is searched using the retrieved state array value (i.e., eight). As depicted in FIG. 5, the state table value of the state table entry associated with state table index of eight includes a pointer to state array $520_8$. The current state array is switched from state array $520_7$ to state array $520_8$ according to the state table value for processing the next character from the input character array.

The fifth character (i.e., ":") is extracted from the input character array. The ":" character is processed for determining a numeric value for character ":" (i.e., colon(:)=58). The state array indices of state array $520_8$ are searched for identifying the state array entry having a state array index of fifty-eight. The state array value associated with the state array entry having a state array index of fifty-eight is equal to negative three. Since the state array value associated with the state array index of fifty-eight is a negative number, message header field name table 540 is searched using the retrieved state array value (i.e., negative three). As depicted in FIG. 5, the message header field name associated with state array value of negative three is "To:".

As such, using state table 510 and associated state arrays 520 in a manner equivalent to the operation of state machine 400 depicted and described with respect to FIG. 4, message header field name "To:" is correctly identified from input character string "<CR><LF>To:". Following successful identification of a message header field name, the current state array is changed from state array $520_8$ to state array $520_0$ in order to reinitialize the implementation 500 for processing the next character from the input character array or, if all characters in the input character have been processed, for processing the first character from the next input character array.

Figure 6:
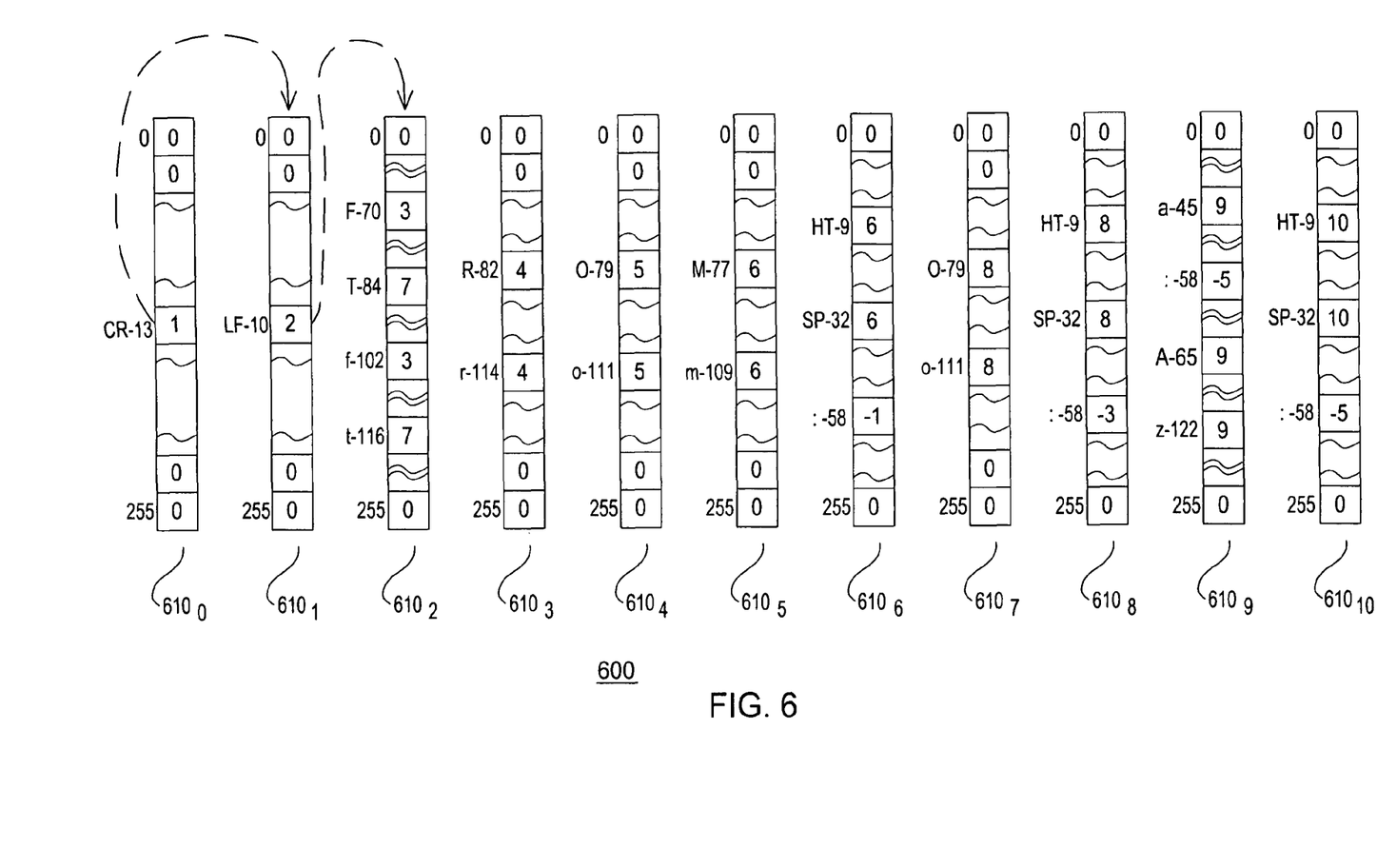
FIG. 6 depicts an implementation of the state machine representation of FIG. 4 implemented using a plurality of state arrays and a state table.

FIG. 6 depicts an implementation of the state machine representation of FIG. 4 implemented using a plurality of state arrays. As depicted in FIG. 6, implementation 600 includes a plurality of state arrays $610_0$-$610_{10}$ (collectively, state arrays 610). Although depicted and described herein with respect to FIG. 6 as using a plurality of state arrays for identifying message field names, in another embodiment, depicted and described herein with respect to FIG. 5, a plurality of state arrays, as well as a state table, may be used for identifying message field names (i.e., since a next state array in not directly identified from a current state array, a separate state table is used for indirectly identifying a next state array).

As depicted in FIG. 6, state arrays 610 operate in a manner similar to state arrays 520 of FIG. 5, however, rather than storing pointers to state table entries in a separate state table storing state array memory addresses (i.e., providing an indirect pointer from a current state array used for processing a current character of a received message to a next state array which may be used for processing a next character of the received message), state array values of each of the state arrays 610 store state array memory addresses (i.e., providing a direct pointer from a current state array used for processing a current character of a received message to a next state array which may be used for processing a next character of the received message).

As such, for each state array entry in each of state arrays 610 of FIG. 6, the array value includes one of: (1) an identifier adapted for identifying a field name, or (2) an identifier adapted for directly identifying the next state array (i.e., without requiring use of an additional state table as required in the embodiment depicted and described with respect to FIG. 5) for processing a next character extracted from a received message (illustratively, a memory address of the next state array). For purposes of clarity, specific memory address identifier examples are not depicted in state arrays 610 of FIG. 6, rather, state array values $610_0$-$610_{10}$ are utilized for indicating the pointers between state arrays 610.

Although not specifically depicted with memory address identifiers (for purposes of clarity), in one such embodiment, in which state array entries include memory addresses for directly pointing to state arrays, a distinction between identifiers adapted for identifying a field name and other identifiers adapted for identifying the next state array may be made by using a minimum (maximum) memory address offset value, such that values below (above) the minimum (maximum) memory address offset value indicate identification of a field name while values above (below) the minimum (maximum) memory address offset value indicate a memory address of a state array.

Figure 7:
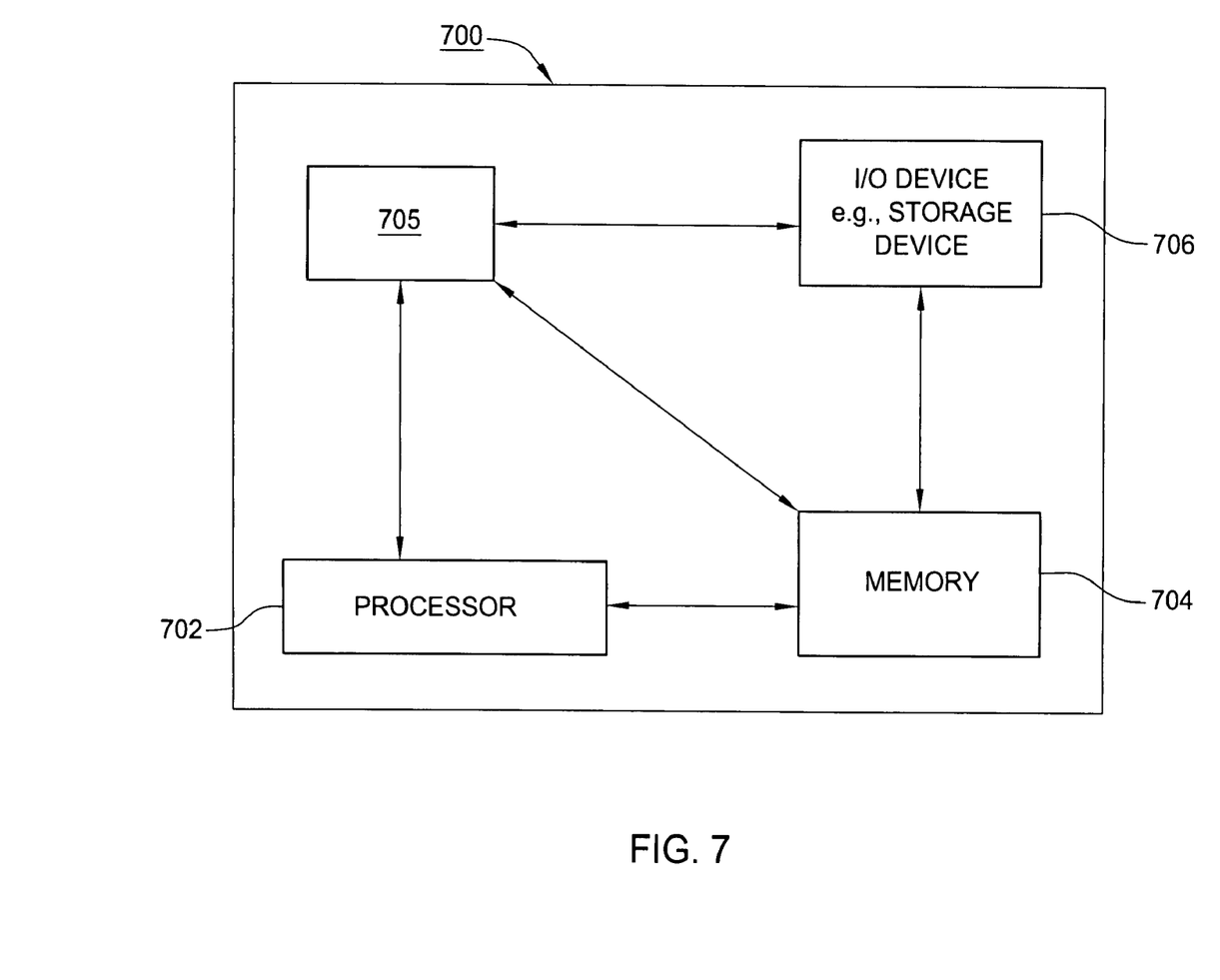
FIG. 7 depicts a high-level block diagram of a general-purpose computer suitable for use in performing the functions described herein.

FIG. 7 depicts a high-level block diagram of a general purpose computer suitable for use in performing the functions described herein. As depicted in FIG. 7, system 700 comprises a processor element 702 (e.g., a CPU), a memory 704, e.g., random access memory (RAM) and/or read only memory (ROM), a message field processing module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present message field processing module or process 705 can be loaded into memory 704 and executed by processor 702 to implement the functions as discussed herein. As such, message field processing process 705 (including associated data structures) of the present invention can be stored on a computer readable medium or carrier, e.g., RAM memory, magnetic or optical drive or diskette and the like.

Although primarily described herein with respect to processing SIP messages for identifying specific SIP message header field names (i.e., "From:" and "To:"), those skilled in the art will appreciate that the present invention may be used for processing SIP messages for identifying various other SIP message header field names. Furthermore, although primarily described herein with respect to processing SIP messages for identifying SIP message header field names, those skilled in the art will appreciate that the present invention may be used for processing SIP messages for identifying various other SIP message portions, including SIP header field name start character offset values, SIP header field name end character offset values, and SIP header field names (and associated SIP header field values), SIP body field name start character offset values, SIP body field name end character offset values, and SIP body field names (and associated SIP body field values), and the like, as well as various combinations thereof.

Moreover, although primarily described herein with respect to processing SIP messages for identifying specific SIP message header field names, those skilled in the art will appreciate that the methodologies of the present invention may be used for processing messages generating using various other protocols. As such, the present invention is not intended to be limited by the protocol used for generating messages, the protocol used for transporting messages, or any other network, protocol, message format, and the like.

Although various embodiments which incorporate the teachings of the present invention have been shown and described in detail herein, those skilled in the art can readily devise many other varied embodiments that still incorporate these teachings.

What is claimed is:

1. A computer-implemented method for identifying field names using a plurality of arrays, comprising:
    receiving a message comprising a plurality of fields having a respective plurality of field names associated therewith, the message comprising a plurality of characters, at least a portion of the characters forming the field names of respective fields; and
    processing characters of the received message for identifying at least one of the field names of the received message, wherein the characters are processed using at least a portion of the arrays, wherein the characters are processed serially, wherein processing characters of the received message serially comprises:
        selecting a first array of the plurality of arrays;
        selecting a character of the received message;
        determining a character identifier of the selected character;
        searching the selected first array using the character identifier of the selected character as an index into the selected first array;
        in response to identifying a matching array entry in the selected first array for the selected character, determining an array value of the matching array entry; and
        in response to a determination that the array value identifies a second array of the plurality of arrays, selecting the identified second array for use in processing a next character of the received message;
        in response to a determination that the array value indicates that one of the field names is identified, determining the identified one of the field names.

2. The computer-implemented method of claim 1, further comprising:
    determining whether the array value of the matching array entry identifies one of the arrays or indicates that one of the field names is identified, based on a value type of the array value.

3. The computer-implemented method of claim 2, further comprising:
    if the value type of the array value is a first type, a determination is made that the array value identifies one of the arrays; or
    if the value type of the array value is a second type, a determination is made that one of the field names is identified.

4. The computer-implemented method of claim 1, wherein, for each selected character, the character identifier of the selected character is an ASCII character code, thereby obviating the need for conversion of at least a portion of the characters of the received message between uppercase and lowercase.

5. The computer-implemented method of claim 1, further comprising:
    in response to a determination that a portion of a field name has been identified when the final character of the received message has been processed, storing a current state of processing for identifying the field name; and
    in response to receiving a next message, resuming processing for identifying the field name, wherein processing is resumed from the current state of processing.

6. The computer-implemented method of claim 1, further comprising:
    processing the received message, using the identified field names, for identifying a plurality of field values associated with the respective fields of the identified field names.

7. A method for identifying field names using a processor and a plurality of arrays stored in memory, the method comprising:
    receiving a message comprising a plurality of fields having a respective plurality of field names associated therewith, the message comprising a plurality of characters, at least a portion of the characters forming the field names of respective fields; and
    processing characters of the received message for identifying at least one of the field names, wherein the characters are processed serially, wherein the characters are processed using at least a portion of the arrays;
    wherein for each of the arrays:
        the array comprises a plurality of array entries, wherein each array entry of the array comprises an index value and an array value;
        wherein the index values of the respective array entries of the array provide keys into the array for searching the array based on character identifiers of respective characters of the received message;
        wherein the array values of the respective array entries of the array each comprise one of:
            an identifier of one of the arrays for selecting the identified one of the arrays for processing a next character to be selected from the received message; or
            an indication that one of the field names has been identified while processing a current character selected from the received message.

8. The method of claim 7, wherein processing characters of the received message for identifying at least one of the field names comprises:
    selecting a first array of the plurality of arrays;
    selecting a character of the received message;
    determining a character identifier of the selected character;
    searching the selected first array using the character identifier of the selected character as an index into the selected first array;
    in response to identifying a matching array entry in the selected first array for the selected character, determining an array value of the matching array entry; and
    in response to a determination that the array value identifies a second array of the plurality of arrays, selecting the identified second array for use in processing a next character of the received message;
    in response to a determination that the array value indicates that one of the field names is identified, determining the identified one of the field names.

9. The method of claim 8, further comprising:
    determining whether the array value of the matching array entry identifies one of the arrays or indicates that one of the field names is identified, based on a value type of the array value, wherein:
        if the value type of the array value is a first type, a determination is made that the array value identifies one of the arrays; or if the value type of the array value is a second type, a determination is made that one of the field names is identified.

10. The method of claim 8, wherein, for each selected character, the character identifier of the selected character is an ASCII character code, thereby obviating the need for conversion of at least a portion of the characters of the received message between uppercase and lowercase.

11. A method for providing arrays configured for enabling identification of field names in received messages, the method comprising:

constructing a plurality of arrays configured for enabling identification of a plurality of field names by processing characters of received messages serially, wherein each array is associated with a different one of a plurality of states;

wherein for each of the arrays:
the array comprises a plurality of array entries, wherein each array entry of the array comprises an index value and an array value;
wherein the index values of the respective array entries of the array provide keys into the array for searching the array based on character identifiers of respective characters of a received message;
wherein the array values of the respective array entries of the array each comprise one of:
an identifier of one of the arrays for enabling selection of the identified one of the arrays for use in processing a next character to be selected from a received message; or
an indication that one of the field names has been identified while processing a current character selected from a received message; and storing the constructed arrays in memory.

12. The method of claim 11, further comprising:
constructing a table comprising a plurality of table entries, each table entry having a table index and a table value;
wherein each table value comprises an identifier for identifying an address of one of the plurality of arrays in the memory.

13. The method of claim 11, further comprising:
receiving a message comprising a plurality of fields having a respective plurality of field names associated therewith, the message comprising a plurality of characters, at least a portion of the characters forming the field names of respective fields; and
processing characters of the received message for identifying at least one of the field names of the received message, wherein the characters are processed using at least a portion of the arrays, wherein the characters are processed serially.

14. The method of claim 11, further comprising:
determining a state machine representation configured for identifying each of the field names;
wherein the state machine representation comprises a plurality of states, each state comprising at least one state transition trigger condition, each state transitioning to at least one other state in response to the respective at least one state transition trigger condition;
wherein the arrays correspond to respective states of the state machine representation, wherein each array index is associated with one of the state transition trigger conditions and each array value is associated with one of the states.

15. An apparatus for identifying field names using a plurality of arrays, comprising:

a receiver for receiving a message comprising a plurality of fields having a respective plurality of field names associated therewith, the message comprising a plurality of characters, at least a portion of the characters forming the field names of respective fields;
a memory for storing the arrays; and
a processor, coupled to the receiver and the memory, for processing characters of the received message for identifying at least one of the field names, the processor for processing the characters using at least a portion of the arrays, the processor for processing the characters serially;

wherein for each of the arrays:
the array comprises a plurality of array entries, wherein each array entry of the array comprises an index value and an array value;
wherein the index values of the respective array entries of the array provide keys into the array for searching the array based on character identifiers of respective characters of the received message;
wherein the array values of the respective array entries of the array each comprise one of:
an identifier of one of the arrays for selecting the identified one of the arrays for processing a next character to be selected from the received message; or
an indication that one of the field names has been identified while processing a current character selected from the received message.

16. The apparatus of claim 15, wherein the processor is adapted for identifying field names by:
selecting a first array of the plurality of arrays;
selecting a character of the received message;
determining a character identifier of the selected character;
searching the selected first array using the character identifier of the selected character as an index into the selected first array;
in response to identifying a matching array entry in the selected first array for the selected character, determining an array value of the matching array entry; and
in response to a determination that the array value identifies a second array of the plurality of arrays, selecting the identified second array for use in processing a next character of the receive message;
in response to a determination that the array value indicates that one of the field names is identified, determining the identified one of the field names.

17. The apparatus of claim 16, wherein the processor is further adapted for:
in response to a determination that the array value indicates that one of the field names is identified, determining the identified field name using the array value of matching array entry; or
in response to a determination that the array value identifies one of the arrays, determining the identified one of the arrays using the array value of the matching array entry.

18. The method of claim 3, wherein the first type is an ASCII character code and the second type is a negative integer.

19. The method of claim 9, wherein the first type is an ASCII character code and the second type is a negative integer.

20. The method of claim 11, wherein, for each of the arrays, the character identifiers of the respective array indexes of the array are ASCII character codes.

* * * * *